Oct. 3, 1967    D. F. CAREY    3,345,438
MANDREL CASTING SOLID PROPELLANT ROCKET FUEL
Filed Feb. 25, 1966
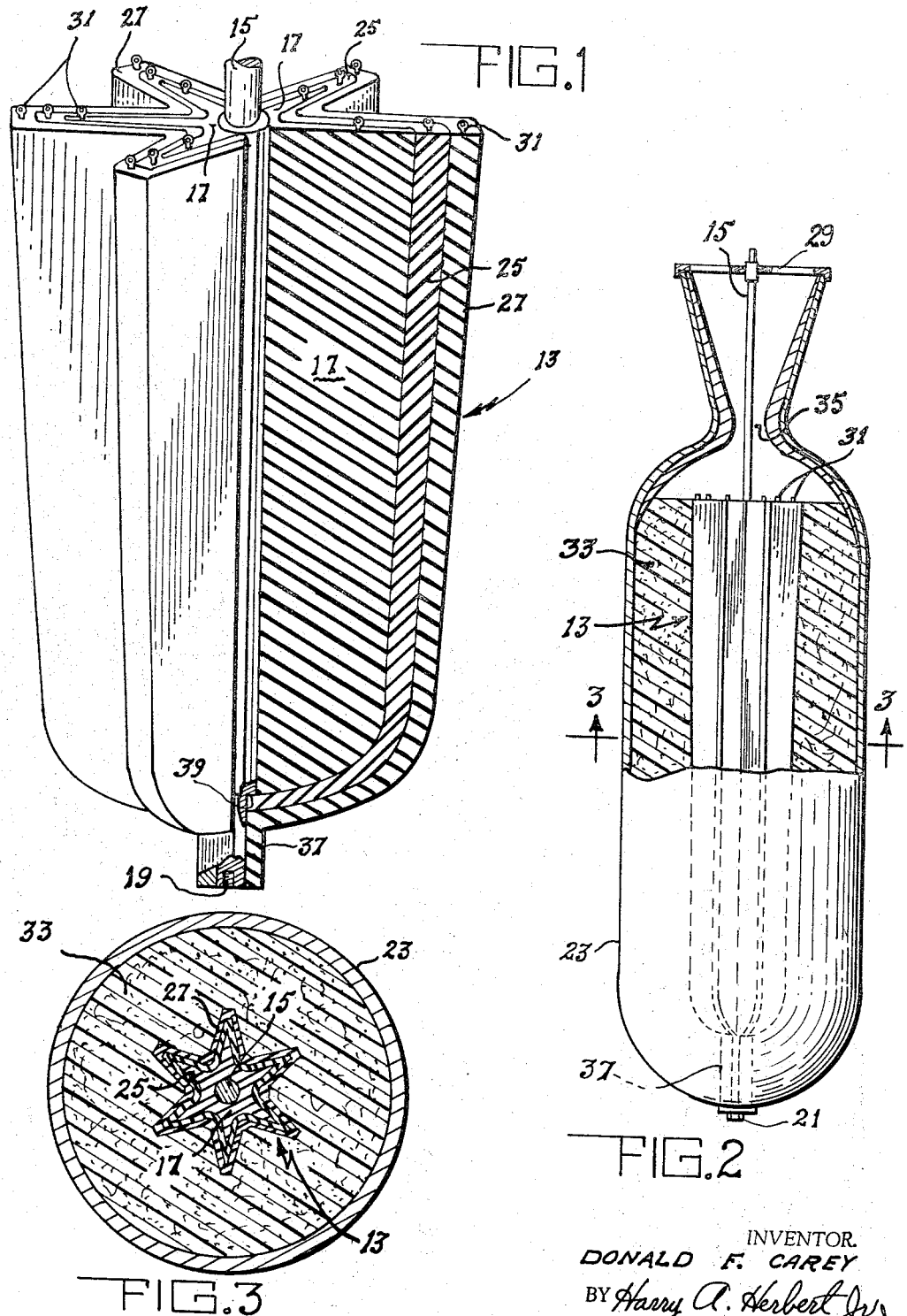
INVENTOR.
DONALD F. CAREY
BY Harry A. Herbert Jr.
Arsen Tashjian
ATTORNEYS

United States Patent Office 3,345,438
Patented Oct. 3, 1967

3,345,438
MANDREL CASTING SOLID PROPELLANT ROCKET FUEL
Donald F. Carey, Brigham City, Utah, assignor to the United States of America as represented by the Secretary of the Air Force
Filed Feb. 25, 1966, Ser. No. 531,650
6 Claims. (Cl. 264—3)

This invention relates to a mandrel for casting or shaping solid propellant fuel in the casing of a rocket motor and, more particularly, is concerned with providing an expandable mandrel core member around which solid rocket propellant fuel may be cast and which is insertable and removable through an opening of smaller diameter than the expanded dimensions of the mandrel.

It is well known in the art of solid fuel rocket motor design that an unusually significant advantage is gained by providing a cavity in the solid propellant charge to produce a larger burning surface so that greater thrust is developed during operation. The size and shape of the cavity in the propellant is a signficant factor in determining the efficiency of the rocket motor. In many presently known rocket motors, the nozzle or aft section is separable from the case section and any convenient size mandrel can be inserted around which the propellant is cast. The mandrel is then removed and the aft section re-attached. With this type of rocket motor case, the only restriction on the mandrel diameter is that of being smaller than the diameter of the case opening.

With the advancements in the rocket motor art, it has been found to be advantageous to provide motor cases having integral aft closures. This arrangement ordinarily limits the size of the mandrel used to the diameter of the nozzle port in the motor case because this port represents the only access to the interior of the case. However, a much more efficient rocket motor could be produced if the internal diameter of the cavity of the propellant charge were considerably larger than the diameter of the nozzle port but presently available reusable mandrels do not permit this.

The present invention provides a mandrel which includes a plurality of radially collapsible laminar elements oriented on a central arbor. Each shell is separately inserted through the small nozzle port in collapsed condition and expands radially to its preformed shape after insertion. The expanded diameter of each shell becomes considerably larger than the nozzle port opening through which it was inserted and the mandrel is assembled in the case by positioning each laminar shell within the previously inserted one. After all the laminar elements have been inserted, the central arbor is placed in a central axially oriented tubular opening in the last inserted element and serves to align and hold the mandrel in position so that the propellant charge can be cast. This arrangement permits an internal cavity in the propellant charge to be considerably larger in diameter than the nozzle port opening.

Accordingly, it is an object of the invention to provide a new and improved mandrel for producing a shaped charge in a solid fuel propellant rocket having an integral aft nozzle port in which the cavity in the shaped charge is larger in diameter than the nozzle port opening.

Another object of the invention is to provide a new and improved mandrel made up of separable elastomeric laminar elements which fit into one another and which are collapsible so as to be insertable through an opening smaller in diameter than their preformed dimensions and self expandable after passage through the opening.

Still another object of the invention is to provide a mandrel for shaping solid propellant rocket fuel for use in a rocket motor having an integrally formed aft section with a nozzle port opening considerably smaller in diameter than the rocket motor case. The mandrel, according to the invention, can be used to form a cavity considerably larger in diameter than the nozzle port opening thereby forming an increased burning surface and providing superior operating characteristics for the rocket motor.

A still further object of the invention is to provide a new and improved mandrel for use in casting solid fuel rocket propellants which includes elements fabricated from a flexible elastomeric material that is coated so as not to adhere to the propellant during the casting process and is reusable for casting additional rocket motor propellant charges.

These and other objects, features and advantages will become more apparent after considering the following detailed description taken in conjunction with annexed drawings and appended claims.

In the drawings wherein like reference characters refer to like parts in the several views:

FIG. 1 is an isometric view in partial section of the assembled mandrel;

FIG. 2 is a view in partial section of an assembled mandrel, according to the invention, positioned within a rocket motor after the solid propellant fuel has been cast; and FIG. 3 is an enlarged cross-sectional view of the assembled rocket motor taken along the line 3—3 of FIG. 2.

Referring now to the drawings, there is shown in FIG. 1 a cutaway view of the mandrel 13 comprising a plurality of laminar elements fabricated of flexible elastomeric material such as rubber. A central arbor 15 is positioned in a centrally located axially oriented cylindrical opening in the innermost laminar element 17. The lower end of the arbor 15 is provided with a threaded opening 19 for receiving a bolt 21 to attach the lower end of the arbor 15 along with the mandrel 13 to the rocket case 23. Also, the bolt 21 in conjunction with the arbor 15 serves to align the lower end of the mandrel 13 in the axial center of the rocket case 23. Around the innermost laminar element 17, there is concentrically positioned an intermediate laminar element 25.

The outer surface of the mandrel 13 comprises an outer laminar element 27 which serves to contain the other elements 25 and 17. The assembled mandrel 13 comprises essentially of a substantially cylindrical arbor 15 surrounded by a plurality of separable, conformable, concentric laminar elements 17, 25, and 27. Although only three laminates are shown in the illustrated embodiment, more layers may be desirable and could be used within the scope of the invention.

A preferred material for the outer laminar element 27 is silicone rubber because of its mold release qualities. However, if desired, the element 27 could be fabricated of a rubber material less expensive than silicone and coated with Teflon (tetrafluoroethylene resin) to aid in releasing it from the propellant surface once the charge has been cast. Inexpensive rubber material is also used for the innermost and intermediate laminar elements 17 and 25.

As shown in FIG. 2, the aft end of arbor 15 is provided with a means for attachment to a spider type orienting fixture 29 for aligning the upper end of arbor 15 relative to the rocket motor central axis. Eye means 31 are provided to aid in withdrawing the various laminar from the rocket motor casing after the propellant charge 33 has been cast therein.

In the practice of the invention the outer laminar element 27 is first inserted in a radially collapsed position into the vertically positioned rocket motor case 23 through the aft nozzle port 35. Once inside the motor the laminar 27 will tend to flex to its extended position. A projection 37 slips into the igniter port at the head end of the motor. Laminar 25 and 17, also in a radially collapsed condition, are successively slipped through the nozzle port 35 and into the extended outer laminar element 27.

After all of the laminar have been inserted, arbor 15 is then slid into place and fastened to the rocket motor case 23 at its lower end by inserting bolt 21 into threaded opening 19. A projecting shoulder 39 on the arbor 15 serves to retain the lower portion of intermediate laminar element 25 firmly against the lower portion of outer laminar element 27. The spider type orienting fixture 29 is attached over the upper end of arbor 15 and provides means for aligning the mandrel 13 relative to the central axis of the rocket motor case 25 by retaining the arbor 15 in a central position with respect to the upper edges of the aft nozzle port 35.

After the mandrel 13 has been assembled and centered within the rocket motor case 23, the propellant is introduced through the aft nozzle port 35 into the area around the mandrel 13 to form the propellant charge 33. When the casting process is completed, the mandrel parts are removed in reverse order. First, the spider type orienting fixture 29 is detached from the arbor 15 and rocket motor case 23 The bolt 21 is removed allowing the arbor 15 to be withdrawn from the mandrel 13. Then the innermost laminar element 17 is removed in radially collapsed condition by hooking through eye means 31 and raising through the aft nozzle port 35. Intermediate and outer laminar elements 25 and 27, respectively, are then removed in the same manner in the order named and in radially collapsed condition. This leaves a large central cavity within the propellant charge 33 thereby providing a large propellant burning surface which results in a rocket motor that is capable ef developing greater thrust during operation.

It will be readily apparent to those skilled in the art that cavities of any desired configuration may be formed in the cast solid propellant fuel by merely modifying the shape and size of the mandrel and laminar elements. Also, although in the illustrative embodiment of the invention described herein, there is shown a mandrel which includes three laminar elements, it should be noted that any reasonable number of laminar elements may be employed without departing from the scope of the invention.

Obviously, certain other alterations and modifications can be made in the location and arrangement of the various elements without departing from the spirit of the disclosed invention. Therefore, it should be understood that the invention is not limited to the preferred embodiment illustrated but may be otherwise practiced within the scope of the appended claims.

Having thus set forth and disclosed the nature of my invention what I claim is:

1. In combination with a solid propellant rocket motor casing having an integrally formed aft nozzle port of substantially smaller diameter than the largest diameter of the motor casing, a mandrel for forming a shaped cavity in the solid propellant cast therein comprising a plurality of separable laminar elements fabricated of elastomeric material, each of said laminar elements being of similar shape and varying diametral dimensions so as to be insertable in the next successively larger element, said laminar elements being radially collapsible to a diametral dimension less than that of the aft nozzle port of said motor casing and self-expandable to a diametral dimension substantially greater than said aft nozzle port after being inserted therethrough, an arbor insertable through an axially oriented cylindrical opening in the central axis of the innermost of said laminar elements, and means for centering said arbor and attached mandrel concentrically within said rocket motor casing, said mandrel being removable after casting the solid propellant in the motor casing and reusable to form cavities in the process of casting other propellant charges of other motor casings.

2. The combination of a solid propellant rocket motor casing and mandrel defined in claim 1 wherein the means for centering said arbor and attached mandrel concentrically within said rocket motor casing includes a spider type orienting fixture positioned between the upper end of said arbor and the aft edge of said aft nozzle port, and threaded means at the lower end of said arbor for retaining said mandrel against the central lower portion of said rocket motor casing.

3. The combination of a solid propellant rocket motor casing and mandrel defined in claim 1 wherein the elastomeric material of which the plurality of separable laminar elements are fabricated consists essentially of silicone rubber.

4. The method of casting a solid propellant fuel in a rocket motor casing having an integrally formed aft nozzle port substantially smaller in diameter than the diameter of the motor casing comprising the steps of radially collapsing an outer laminar element of elastomeric material having a shape corresponding to the desired configuration of a cavity to be formed in said solid propellant, inserting said collapsed outer laminar element into the aft nozzle port of said rocket motor casing, said outer laminar element expanding to a diametral dimension greater than that of the aft nozzle port after insertion therethrough, inserting a radially collapsed intermediate laminar element through the aft nozzle port, said intermediate laminar element being dimensioned to fit into said outer laminar element and expand to fit snugly therein, inserting a radially collapsed innermost laminar element through the aft nozzle port, said innermost laminar element having an axially oriented cylindrical opening through the axis thereof, inserting an arbor through the cylindrical opening in said innermost laminar element, attaching the lower end of said arbor to the forward center of said rocket motor casing, attaching a spider type orienting fixture between the upper end of said arbor and the aft edge of the aft nozzle port, casting the propellant fuel around the sides of said outer laminar element, allowing said propellant fuel to solidify, removing said spider type orienting fixture, detaching the lower end of said arbor from the forward end of said rocket motor casing, withdrawing said arbor from said innermost laminar element, withdrawing said laminar elements in radially collapsed condition through the aft nozzle port in the reverse order from the order of insertion, thereby forming a cavity in the solid propellant fuel which is larger than the diametral dimension of the aft nozzle port in the rocket motor casing.

5. The method of claim 4 wherein the elastomeric material from which the laminar elements are fabricated is silicone rubber.

6. The method of claim 4 wherein the elastomeric material from which the outer laminar element is fabricated is tetrafluoroethylene resin coated rubber.

References Cited

UNITED STATES PATENTS

| 3,120,028 | 2/1964 | Streeter et al. | 18—45 |
| 3,136,002 | 6/1964 | Schwartz | 264—3 |
| 3,193,883 | 7/1965 | Thibodaux et al. | 264—3 |

L. DEWAYNE RUTLEDGE, *Primary Examiner.*